United States Patent [19]

Su

[11] 3,846,387

[45] Nov. 5, 1974

[54] CHAIN SATURATED COPOLYMERS OF ETHYLENE, ALPHA MONOOLEFINS, AND TRIENES CONTAINING SIDE-CHAINS WITH NON-TERMINAL CONJUGATED UNSATURATION

[75] Inventor: Aaron Chung Liong Su, Wilmington, Del.

[73] Assignee: E. I. du Pont de Nemours and Company, Wilmington, Del.

[22] Filed: Mar. 29, 1972

[21] Appl. No.: 239,322

[52] U.S. Cl............ 260/80.78, 260/79 SC, 260/848
[51] Int. Cl......................... C08f 15/40, C08f 27/00
[58] Field of Search......................... 260/80.7, 80.78

[56] References Cited
UNITED STATES PATENTS

| | | | |
|---|---|---|---|
| 3,036,997 | 5/1962 | Campbell | 260/77.5 |
| 3,278,641 | 10/1966 | Bell | 260/878 |
| 3,285,889 | 11/1966 | Arnold | 260/80.7 |
| 3,418,299 | 12/1968 | Benedikter | 260/85.3 |
| 3,480,599 | 11/1969 | Park | 260/80.7 |

FOREIGN PATENTS OR APPLICATIONS 1,095,090   12/1967   Great Britain

OTHER PUBLICATIONS

Arakawa et al., Journal of Chem. Soc. of Japan, Vol. 74, No. 6, p. 1143, June 1971.

*Primary Examiner*—Edward J. Smith

[57] ABSTRACT

An elastomeric EPTM copolymer is provided which has an inherent viscosity of about 0.2–6.0, which will undergo a conventional Diels-Alder reaction with a dienophile, and which has a substantially saturated backbone chain with side-chains containing non-terminal conjugated double bonds. A method is also disclosed for preparing the EOTM copolymer using an aluminum/magnesium/titanium catalyst.

8 Claims, No Drawings

CHAIN SATURATED COPOLYMERS OF ETHYLENE, ALPHA MONOOLEFINS, AND TRIENES CONTAINING SIDE-CHAINS WITH NON-TERMINAL CONJUGATED UNSATURATION

BACKGROUND

This invention relates to elastomeric ethylene/α-monoolefin/triene (hereinafter EOTM) copolymers and more particularly to EOTM copolymers which can be cured by conventional methods and which will also undergo a conventional Diels-Alder reaction with a dienophile.

Ethylene/α-olefin (hereinafter EOM) copolymers are well-known elastomers having a saturated chain. Ethylene/propylene dipolymers (EPM) are an example. Since EOM copolymers have too little unsaturation for a sulfur cure, they are difficult to cure and generally require the use of expensive curing methods such as peroxide curing, which can give vulcanizates have objectionable odor.

Certain non-conjugated dienes such as 1,4-hexadiene and 5-ethylidene-2-norbornene have been added as an additional monomer to produce polymers with sufficient side-chain ethylenic unsaturation for sulfur curing. These ethylene copolymers are broadly classed as EODM polymers of which ethylene/propylene/non-conjugated diene copolymers (EPDM) are commercially important examples. Known EODM polymers of this type can be sulfur cured, but they cannot be cured by certain desirable curing reactions such as the Diels-Alder reaction.

Non-conjugated trienes such as 1,4,7-octatriene have been suggested for making ethylene copolymers having a high degree of unsaturation for curing, but such trienemodified copolymers are limited to the same curing methods employed for diene-modified copolymers. The conjugated trienes 1,3,5-hexatriene and 1,3,7-octatriene have also been suggested, but these trienes copolymerize at both terminal bonds. A certain amount of unsaturation is introduced into the copolymer backbones, making these copolymers less stable than ethylene-propylene dipolymers. Moreover, the copolymers are significantly cross-linked, resulting in unduly high gel contents which render subsequent processing more difficult; and the cross-linking eliminates many of the potential cure sites.

Traditional curing methods often introduce processing problems or cause undesirable side effects. For example, peroxide curing agents are potentially hazardous and necessitate safety precautions. These agents also will react with many common processing oils, reducing the amount of curing agent available to cure the copolymers.

Sulfur curing agents are often compounded with accelerators to cure ethylene copolymers. These curing systems also form curing by-products which can attack materials in contact with or embedded in the ethylene copolymer. Additional objections to sulfur curing are the tendency of sulfur to "bloom" to the cured surface, making the cured article aesthetically displeasing, and the tendency to react with certain aromatic processing oils, reducing the amount of sulfur available to cure the copolymer. Moreover, sulfur-cured articles are subject to overcure and cure reversion, both of which have an adverse effect on the physical properties of the cured article.

Resin cures are potentially attractive in that cross-links are formed which are more stable than those created by sulfur curing, and the cured articles retain their stress-strain properties when heat aged. However, the copolymer tends to set up prematurely while undergoing curing and yet takes an unduly long time to attain final properties. Tin chloride has been proposed as an additive to overcome the aforementioned problems, but this additive causes formation of corrosive acids which damage the expensive curing molds.

Thus, there has been a need for ethylene copolymers which can be cured by methods in addition to those normally used in EOM and EODM curing. There has also been a need for a polymerization process which can produce ethylene copolymers having an essentially saturated backbone chain with side-chains having a high degree of unsaturation, which copolymers will have good stability and can be economically processed to a high state of vulcanization.

SUMMARY

This invention provides an ethylene/α-monoolefin/triene copolymer which has a substantially saturated backbone chain with side-chains containing non-terminal conjugated double bonds. This copolymer has an inherent viscosity of about 0.2 to 6.0, and the cured polymer has excellent elastomeric properties.

The copolymer is prepared by copolymerizing ethylene, a low molecular weight α-monoolefin, and a triene having non-terminal conjugated unsaturation and a terminal vinyl group. Polymerization is conducted in the presence of an aluminum/magnesium/titanium catalyst at a temperature of about −20° to 150°C.

This copolymer can be cured with a polydienophile agent by Diels-Alder addition as well as by conventional EODM curing methods such as sulfur curing, peroxide curing, and resin curing.

DESCRIPTION

The ethylene/α-monoolefin/triene copolymers of this invention are elastomeric high molecular weight copolymers having an inherent viscosity of about 0.2 to 6.0, preferably about 1.5 to 5, as measured at 30°C. on a solution of 0.1 gram of polymer in 100 ml. of tetrachloroethylene. These copolymers can be considered EOM polymers having monomeric units from ethylene and at least one low molecular weight α-monoolefin with additional monomeric units from at least one of certain low molecular weight trienes. Low molecular weight α-monoolefins having 3–18 carbon atoms are most often used. The ethylene and α-monoolefin units are present in the weight ratio range of about 15-75/-85-25 with respect to each other, and the triene units are present in an amount of about 0.1 to 10 mole percent of the total monomeric units of the polymer. In a preferred copolymer, propylene and 1,4,6-octatriene are copolymerized with ethylene to form a terpolymer consisting of 18.8 to 85.0 mole percent ethylene, 13.4 to 79.0 mole percent propylene, and 0.1 to 10.0 mole percent 1,4,6-octatriene.

The term "triene," as used herein, refers to a polyene having at least three functional ethylenic bonds in a substantially linear chain. For this invention two non-terminal ethylenic bonds of the triene must be conjugated and a third bond must be non-conjugated and in a terminal position. The conjugated bonds will be referred to herein as the "dienic group." The triene is represented by the formula:

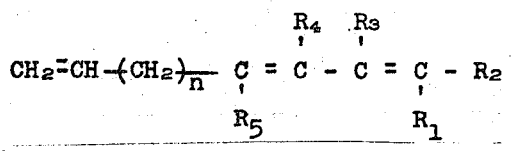

where $n$ is 1 to 19; $R_1$ is $C_1-C_2$ alkyl; $R_2-R_5$ are independently selected from hydrogen and $C_1-C_2$ alkyl; and $R_3$ and $R_4$ can be jointly $(CH_2)_m$ where $m = 2-5$. Preferably, the integer n is 1 to 5. Especially preferred trienes are 1,4,6-octatriene, 1,5,7-nonatriene, and 1,6,8-decatriene.

The α-monoolefins useful in practicing this invention include propylene and higher α-monoolefins having the structure:

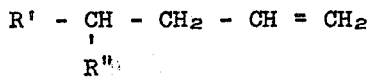

where R' and R'' are hydrogen or alkyl, with the proviso that R'' is hydrogen when R' is $CH_3$. Preferred α-monoolefins include propylene, 1-butene, 1-pentene, and 1-hexene. Propylene is especially preferred because of availability, cost, and relative reactivity in polymerization. Other useful α-olefins include 1-heptene, 1-octene, 1-decene, 5-methyl-1-nonene, 5,5-dimethyl-1-octene, 4-methyl-1-hexene, 5-methyl-1-hexene, 4-methyl-1-heptene, 5-methyl-1-heptene, 4,4-dimethyl-1-hexene, 5,6,6-trimethyl-1-heptene, 1-dodecene, and 1-octadecene.

Both the α-monoolefin and triene can have substituents which do not substantially interfere with the copolymerization, curing, and use of the copolymer product. It will also be understood that mixtures of trienes and α-monoolefins in the classes defined above can be used in practicing the invention.

In addition to the three monomers mentioned above, other monomers can be incorporated in minor amounts which do not substantially interfere with the polymerization or curing. Monomers which introduce any significant degree of unsaturation into the backbone chain or which poison the catalyst should, however, be avoided.

The EOTM polymers of this invention can be prepared by mixing ethylene, at least one low molecular weight α-monoolefin of the class defined above, and at least one triene of the class defined above in the presence of an aluminum/magnesium/titanium catalyst and allowing the monomers to copolymerize to produce an elastomeric EOTM polymer having an inherent viscosity of about 0.2 to 6.0. Generally, a reaction solvent will be used.

Well-known methods of mixing the monomers and catalyst can be used, and customary precautions such as maintaining the catalyst free of water and oxygen must be taken. Copolymer preparation can be either by conventional batch or continuous methods. The reaction temperature can be between −20° and 150°C., and the reaction pressure can be from about atmospheric to several hundred atmospheres depending on the desired reaction rate and copolymer weight for a particular monomer-catalyst system. Generally, copolymers with lower molecular weights will be prepared at higher reaction temperatures. It will be appreciated that copolymerization rate also depends on catalyst and monomer concentrations, which for a gaseous monomer is a function of reaction pressure. Copolymerization at about 30°C. and at super atmospheric pressures is preferred.

Solvents which can be used for the polymerization of olefins and polyenes in the presence of coordination catalysts are well known. Such solvents include aliphatic, cycloaliphatic, and aromatic hydrocarbons, and non-reactive chlorinated compounds. The solvent must dissolve the monomers and not react or interfere with the catalyst components. Preferred solvents include toluene, benzene, and chlorobenzene.

The polymerization can be stopped, the polymer isolated, and purified if desired, by conventional means. Alcohol can be added to deactivate the catalyst thus stopping the reaction. Drum drying, steam isolation, precipitation with alcohol, and high temperature phase decantation are typical methods for recovering the polymer.

A preferred catalyst used to produce the EOTM copolymer of this invention consists essentially of (A) at least one organoaluminum compound, (B) at least one organo-magnesium compound, and (C) at least one hydrocarbon soluble titanium compound. Other catalysts which can be used to produce the EOTM copolymer of this invention are described in U.S. Pat. No. 2,939,845 and British Pat. No. 1,095,090. Vanadium compounds can be substituted for titanium compound but are not preferred because of lower resistance to poisoning by conjugated unsaturation of the trienes. Lithium substitution for magnesium is not satisfactory.

Concentration of catalyst in the reaction mixture can range from about 0.1 to 10 millimoles of titanium per liter of reactants, with magnesium and aluminum concentration determined by the following atomic ratios:

Al:Mg is (1–20):1

Mg:Ti is (1–5):1

The most preferred Al:Mg:Ti ratio is 10:3:1.

Aluminum compounds which can be used in the catalyst for producing the EOTM copolymers of this invention include a wide variety of organoaluminum halides recognized by the art to be useful in coordination polymerization catalysts. Such typical organoaluminum halides include for example dialkylaluminum halides, alkylaluminum dihalides, arylaluminum halides, and mixtures thereof, e.g., sesquihalides. The chlorides and bromides are especially preferred halides, but the iodides can be used. Representative suitable organoaluminum halides are the following: dimethylaluminum chloride, diethylaluminum chloride, ethylaluminum sesquichloride, ethylaluminum dichloride, diisobutylaluminum chloride, ethylaluminum dibromide, isobutylaluminum dichloride, di-n-hexylaluminum chloride, n-dodecylaluminum dichloride, dioctadecylaluminum chloride, decyl ethylaluminum chloride, dimethylaluminum bromide, diethylaluminum bromide, isoamyl dodecylaluminum iodide, diethylaluminum bromide, isoamyl dodecylaluminum iodide, butylaluminum sesquiiodide, phenylaluminum sesquiiodide, diphenylaluminum chloride, and octadecylaluminum dichloride. Preferred are the acylic organoaluminum halides in which the acylic groups contain 2–12 carbon atoms such as diethylaluminum chloride, diethylaluminum bromide, ethylaluminum dichloride, dipropylaluminum chloride, diisobutylaluminum chloride, isobutylaluminum dichloride, and diisobutylaluminum bromide.

The organomagnesium compounds which can be used for making the preferred titanium catalysts are well known. Conveniently employed are compounds of the formula $R_1R_2Mg$ which contain a total of about 8–30 carbon atoms wherein $R_1$ and $R_2$ can be the same or different and can be, for example, alkyl, aralkyl, alkaryl, cycloalkyl, alkenyl, aryl substituted alkenyl, cycloalkenyl, or aryl. Preferred are diarylmagnesium compounds where the aryl radicals can each have 6 to 22 carbon atoms and dialkylmagnesium compounds wherein the alkyl radicals can each have 2 to 20 carbon atoms.

Suitable magnesium compounds include, for example, methyl-n-heptylmagnesium, ethyl-n-hexylmagnesium, n-butyl-sec-butylmagnesium, di-sec-butylmagnesium, n-amyl-sec-butyl-magnesium, di-n-octylmagnesium, di-n-dodecylmagnesium, dicyclopentylmagnesium, dicyclopentylmagnesium, dicyclohexylmagnesium, dicyclododecylmagnesium, ethylcyclohexylmagnesium, n-butylcyclohexylmagnesium, ethylbenzylmagnesium, n-butylbenzylmagnesium, dibenzylmagnesium, isopentylallylmagnesium, diisopentenylmagnesium, sec-butylhexenylmagnesium, allyl benzylmagnesium, benzylpentnylmagnesium, sec-butylcyclohexenylmagnesium, dicyclohexenylmagnesium, benzylcyclohexenylmagnesium, and 3-phenylpentenylethylmagnesium. Also useful are the diaryl magnesium compounds disclosed in British Pat. No. 1,095,090 to Minchak and U.S. Pat. No. 2,939,845 to Stamatoff. Preferred organomagnesium compounds are diphenylmagnesium, n-butyl-sec-butylmagnesium, n-butyl-secamylmagnesium, and dicyclohexylmagnesium.

A wide variety of hyrocarbon soluble titanium compounds recognized by the art to be useful in polymerization catalysts can be employed in this invention. Typical of such hydrocarbon soluble titanium compounds are $Ti^{+3}$ and $Ti^{+4}$ compounds and include, for example, titanium tris-(acetylacetonate), titanium tetrabromide, titanium tetrachloride, dichlorotitanium bis(acetylacetonate), tetrakis-(2-ethyl hexyl)titanate, tetrabutyl titanate, tetraethyl titanate, tetramethyl titanate, tetrapropyl titanate, tetraisopropyl titanate, tetrabenzyl titanate, dimethyl titanium dichloride and methyl titanium trichloride. Conveniently, readily available titanium compounds such as titanium tris-(acetylacetonate), titanium tetrachloride, and titanium tetrabromide are employed.

Preferred catalyst combinations include diisobutylaluminum chloride (hereinafter DIBAC)/diphenylmagnesium/titanium tetrachloride, DIBAC/butyl-sec-butyl magnesium/titanium tetrachloride or the corresponding bromides.

The catalyst can be preformed or prepared in situ. Likewise, the components can be added in any order to prepare the catalyst.

The ethylene/α-monoolefin/triene monomers copolymerize in the presence of the catalyst system of this invention to produce EOTM copolymer having a substantially saturated backbone chain and side-chains with conjugated non-terminal unsaturation separated from the backbone by at least one methylene group. Thus, the trienic monomer unit is polymerized into the polymer chain through the terminal non-conjugated ethylenic bond leaving the conjugated dienic group in the side-chain.

This substantially saturated backbone with unsaturated side-chain configuration produces a copolymer with excellent stability and elastomeric properties, which can readily be cured by more general methods than possible with known EOM and EPDM type polymers. The copolymers are substantially amorphous rubbery materials with the triene units distributed randomly along the polymer backbone as shown by vulcanization to materials with low permanent set at break.

A variety of functional groups may be grafted to the copolymer by Diels-Alder addition of suitable dienophiles followed by curing of the grafted copolymer, as shown:

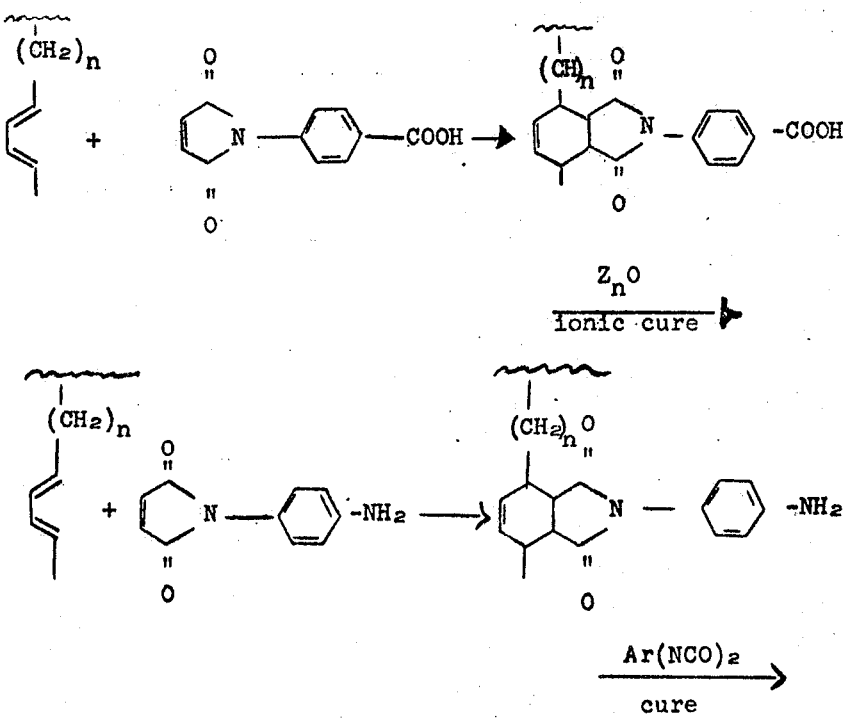

where $n$ is 1 to 20, ⌇ represents an EOTM copolymer backbone chain, and Ar represents an arylene radical.

EOTM copolymers of this invention can be cured by a conventional Diels-Alder reaction with a bis-dienophile and by conventional methods using curing agents such as sulfur, sulfur-bearing compounds, organic peroxides, heat hardenable phenolic resins, and other agents familiar to those skilled in the art.

A conventional Diels-Alder reaction involves condensation of conjugated ethylenic unsaturation with an ethylenic group having an activating neighbor functionality to form a cyclic group having residual ethylenic unsaturation. This reaction is represented by the following schematic equation:

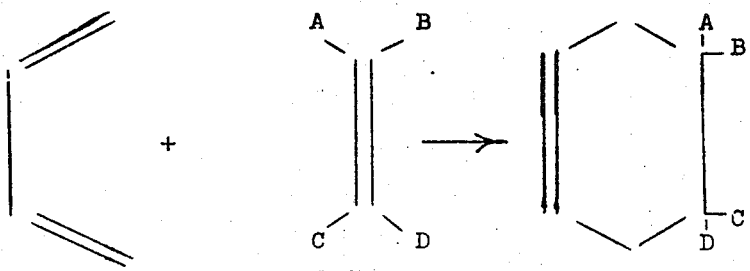

where A, B, C, and D are hydrogen, alkyl, or electron withdrawing groups, with at least one electron withdrawing group preferably being present.

The atoms, which are not shown, at the juncture of the bond lines are normally carbon atoms which would have additional bonds connected to atoms such as hydrogen, carbon, or compatible functional substituent groups such as the keto group.

For curing the EOTM copolymer of this invention a bis(dienophile) is used so that a polymer chain bearing the dienic group can be connected to another such chain by the Diels-Alder reaction, for example:

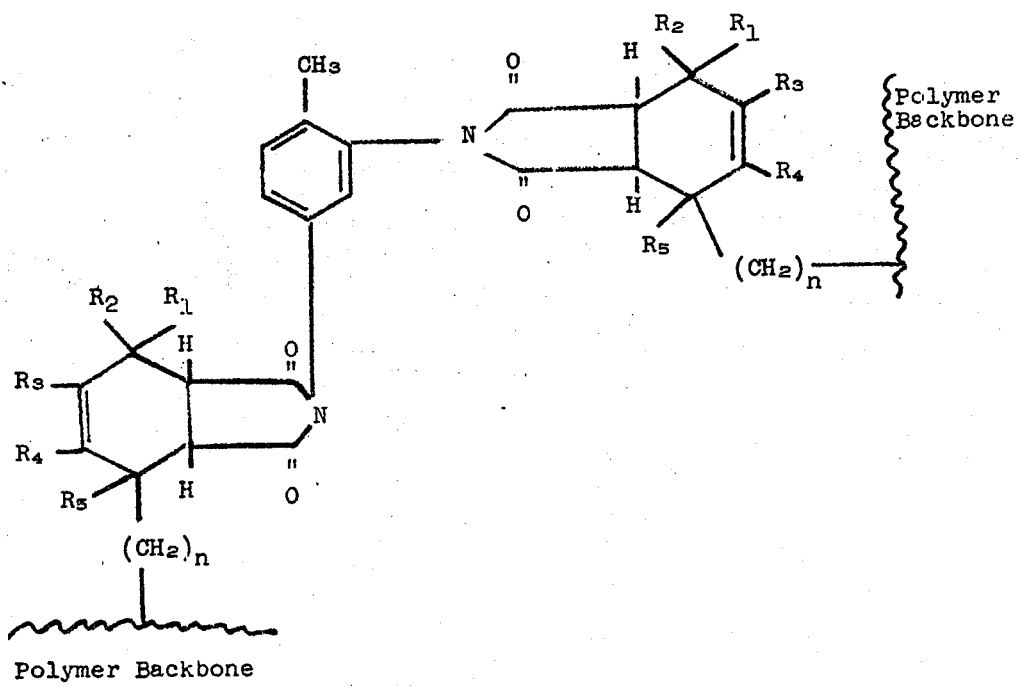

Polymer Backbone

Bis(dienophiles) which can be used for this purpose are known in the art and include aldehydes, ketones, sulfones, nitriles, and carboxylic acids (and imides, amides, and esters thereof) which have two $\alpha,\beta$-carbon-carbon double bonds. Representative bis(dienophiles) include alkylene bis(maleimides) such as ethylene-, hexamethylene-, and decamethylene bis(maleimide), cycloalkylene bis(maleimides) such as cyclohexylene bis(maleimides), and arylene bis(maleimides) such as o-, m-, and p-phenylene bis(maleimide), the tolylene bis(maleimides), and the naphthylene bis(maleimides). In general, these bis(maleimides can be represented by Y-Q-Y where Y is

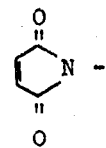

and Q is hydrocarbylene (a divalent hydrocarbon radical). Other bis(dienophiles) include hydrocarbylene bis($\beta$-acroleins) such as phenylene bis($\beta$-acrolein)

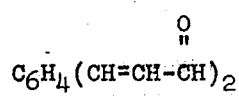

hydrocarbylenebis(vinylcarbonyl) compounds such as diacrylylbenzene

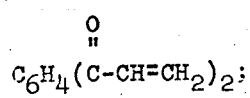

hydrocarbylenebis(vinylsulfonyl) compounds such as 1,2-bis(vinylsulfonyl)ethane ($CH_2=CH-SO_2)_2C_2H_4$; hydrocarbylenebis(vinylcarbonyloxy) compounds such as low molecular weight acrylic and methacrylic esters and amides of glycols and diamines, e.g., ethylene diacrylate, p-phenylene diacrylate, and N,N'-dimethyl, N,N'-ethylenebisacrylamide. Hydrocarbon bis(dienophiles) are useful and include compounds such as p-divinyl benzene. Particular compounds or mixtures of compounds can be selected to produce the desired cured copolymer with minimum routine experimentation for a particular system.

Curing conditions which can be used for this invention are also conventional. Temperatures in the range of about 150° to 200°C. and ram values of about 13,600 to 18,100 kg. are typical. The curing rate will vary with the particular EOTM polymer and curing system, but optimum curing conditions and curing component concentrations can readily be determined by one skilled in the art by routine experimentation. Curing time of 5 to 30 minutes are representative.

The uncured EOTM copolymers of this invention exhibit attractive low temperature properties, e.g., low glass transition temperatures. The cured copolymers offer good elastomer properties over a broad temperature range (e.g., low brittle point temperatures, low Clash-Berg temperatures) with good stability and useful life. The cured copolymers can be used for curing bladders, penumatic tires, gaskets, hose, molded articles, etc. It will be understood by those skilled in the art that the EOTM copolymers of this invention can be compounded with standard additives to adapt the copolymer for specific uses.

In the examples that follow inherent viscosity is measured using a solution of 0.1 grams of copolymer in 100 milliliters of tetrachloroethylene at 30°C. Stress-strain data including modulus, extension at break, and tensile strength are determined in accordance with ASTM D-412-66. Permanent set at break is determined in accordance with ASTM D-412-66, section 5.5 modified by a 5-minute hold time. In the examples parts, percentages, and ratios are by weight unless otherwise indicated.

EXAMPLE 1

A. Preparation of 1,4,6-octatriene

A 500-ml. pressure bottle is charged with 14.4 gm. of $CoCl_2 \cdot 6H_2O$, 60 gm. of KCN, 8 gm. of $AlCl_3$, 80 ml. of 1,3,7-octatriene (contaminated with 25 percent by weight of 4-vinylcyclohexene), and 200 ml. of dimethylsulfoxide. The bottle is evacuated and pressured to an absolute pressure of 3.16 kg./cm² with hydrogen. The bottle is heated to 70°C. and agitated at 70°C. in a shaker apparatus for 18 hours. Then an additional 7.2 gm. of $CoCl_2 \cdot 6H_2O$, 30 gm. of KCN, and 2 gm. of $AlCl_3$ are added, and agitation is continued at 60°C. for an additional 16 hours.

After this time the reaction mixture is cooled to room temperature and depressurized. The mixture is diluted with pentane and shaken, the pentane layer is separated, and the sulfoxide solution is extracted two more times with pentane. The combined pentane solutions are stripped of pentane on a rotary evaporator to yield 60 ml. of product. Analysis of this product by gas chromatograph (gc) typically gives the following results:

| | |
|---|---|
| 4-vinylcyclohexene | 25% |
| 1,4,6-octatriene | 69% |
| 1,3,7-octatriene | 3.5% |
| octadienes | 1.5% |
| other octatrienes | 1.0% |

The olefin mixture is subjected to an azeotropic distillation with acetonitrile to remove the 4-vinylcyclohexene and other octadienes. Then the acetonitrile is removed by extraction with water, and the product is distilled (b.p. 32°C. at 15 torr), yielding substantially pure 1,4,6-octatriene. Analysis by gas chromatograph gives the following results:

| | |
|---|---|
| 1,4,6-octatriene | 97.5% |
| 1,3,7-octatriene | 2.0% |
| OTHER OCTATRIENES | 0.5% |

B. Preparation of Ethylene/Propylene/1,4,6-Octatriene Copolymer

A protective nitrogen atmosphere is maintained in a one-liter atmospheric pressure glass resin kettle batch reactor furnished with a stirrer, gas inlet and outlet tubes, a thermometer, and a 3-way stopcock.

Five-hundred milliliters of toluene and 60 milliliters of 1,4,6-octatriene are added to the reactor, and the temperature is raised to 30°C. by a thermostatically controlled water bath. Ethylene (1 liter/min.) and propylene (3 liters/min.) are continuously introduced thereafter. When the liquid phase in the reactor has been saturated with these gaseous monomers, the catalyst is formed in situ by rapid successive injections of 0.010 gram-mols of diisobutyl aluminum chloride (as a one molar solution in hexane), 0.0033 gram-mols of diphenyl magnesium (as a 0.14 molar solution in a mixture of benzene and chlorobenzene), and 0.001 gram-mols of $TiCl_4$. The copolymerization reaction is run for 3.0 hours at 30°C. Then 10 milliliters of isopropyl alcohol are added to deactivate the catalyst; about 1.5 grams of 4,4'-thiobis(3-methyl-6-tert-butyl phenol) antioxidant are present in the alcohol.

Thirty grams of ethylene/propylene/1,4,6-octatriene are isolated by pouring the reactor liquid phase into methanol and drying the precipitated product under vacuum. This tripolymer has an inherent viscosity of about 2.0 and has the following monomer unit composition by weight: 64.7 percent ethylene, 30.2 percent propylene, 5 percent 1,4,6-octatriene units. The tripolymer is essentially gel gree.

The tripolymer displays a major infrared absorption band at 10.3 microns, characteristic of trans-internal unsaturation. Vinyl unsaturation peak near 10 and 11 microns are either missing or very small, indicating that incorporation of the triene through the conjugated double bonds does not occur or occurs to an insignificant extent.

C. Diels-Alder Cure of the Ethylene/Propylene/1,4,6-Octatriene Copolymer Using Tolylene-bis(maleimide)

A portion of the tripolymer of Part B is compounded on a rubber roll mill using the following recipe:

| | |
|---|---|
| Ethylene/Propylene/1,4,6-octadiene Copolymer | 100 |
| 4,4'-thiobis(3-methyl-6-tert-butylphenol | 1 |
| 2,4-tolylene-bis(maleimide) | 2 |

After this composition has been cured at 185°C. for 20 minutes, it displays the following properties at 25°C.:

| | |
|---|---|
| Tensile Strength at Break (Kg/cm²) | 67 |
| Extension at Break (%) | 200 |
| Permanent Set at Break (%) | 7 |

D. Resin Cure of the Ethylene/Propylene/1,4,6-Octatriene Copolymer

A p-tert-octyl phenol/formaldehyde resin is prepared by reacting a p-tert-octyl phenol/formaldehyde resole with H Br in accordance with Example 5 of U.S. Pat. No. 2,972,600. The resin has a specific gravity of 1.00 to 1.10, a melting point in the range of 52° to 63°C., a bromine atom content of 3.6 to 3.9 percent by weight, and a methylol content of 1.00 to 1.25 percent by weight.

A portion of the tripolymer of Part B is compounded on a rubber roll mill using the following recipe:

| | |
|---|---|
| Ethylene/Propylene/1,4,6-Octatriene Copolymer | 100 |
| Resin | 12 |
| Zinc Oxide | 5 |

After this composition has been cured at 185°C. for 30 minutes, it displays the following properties at 25°C.:

| | |
|---|---|
| Modulus at 100% Extension (Kg/cm$^2$) | 25 |
| Modulus at 300% Extension (Kg/cm$^2$) | 60 |
| Tensile Strength at Break (Kg/cm$^2$) | 105 |
| Extension at Break (%) | 460 |
| Permanent Set at Break (%) | 65 |

EXAMPLE 2

A. Preparation of 1,6,8-Decatriene 1,4,9-Decatriene is isomerized to 1,6,8-decatriene by passing the vapor through a column containing RuCl$_3$ (1 part) supported on SiC (40 parts) at 225° to 275°C.

B. Preparation of Ethylene/Propylene/1,6,8-Decatriene Copolymer

A 375-ml. atmospheric pressure continuous reactor is employed at 30°C. using toluene as solvent. The toluene is dried over silica gel and thoroughly sparged with N$_2$ before use. Residence time is one hour. Ethylene and propylene are supplied at 450 ml./min. and 900 ml./min., respectively; 1,6,8-decatriene is introduced at the rate of 15 ml./hr. Diisobutylaluminum chloride, dibutyl magnesium, and titanium tetrachloride are separately and continuously supplied to form a coordination catalyst in situ; the Ti concentration is 0.001 gram-atom/liter; Al:Mg:Ti = 10:3:1. Reactor effluent is discharged to a wash vessel together with an isopropanol solution of 4,4'-thiobis(3-methyl-6-tert-butylphenol) [0.5 percent based on copolymer] and washed with agitated 10 percent sulfuric acid under nitrogen. The organic layer is then washed 2 to 3 times with water. Copolymer crumb, precipitated by addition of methanol to the washed toluene solution in a mechanical blender, is filtered off, immediately swollen in a benzene solution of 4,4'-thiobis(3-methyl-6-tert-butylphenol) [0.5 percent based on copolymer] and pan dried. Infrared analysis typically indicates good removal of catalyst residues has occurred. (If the acid wash is omitted, the copolymer has infrared bands at 3.0 μ and 6.2 μ indicative of catalyst residues.)

The fraction of the copolymer which is soluble in tetrachloroethylene at 25°C. (about 80 percent) typically has an inherent viscosity of 2.5 to 3.5 (measured at 30°C. on a solution of 0.1 gram of the fraction in 100 ml of tetrachloroethylene). The copolymer has about 0.45 gram-mol/kg. of side-chain C = C groups and the following monomer unit composition: 32 percent ethylene, 65 percent propylene, and 3 percent 1,6,8-decatriene.

EXAMPLE 3

A. Diels-Alder Cure of Ethylene/Propylene/1,6,8-Decatriene Copolymer using m-Phenylenebis(maleimide)

A copolymer having a monomer unit composition of 28.4 percent ethylene, 70 percent propylene, and 1.6 percent 1,6,8-decatriene is prepared by a procedure similar to that of Example 2B. The copolymer is 85 percent soluble in tetrachloroethylene at 25°C., the soluble fraction has an inherent viscosity of 3.11, and the copolymer has about 0.24 gram-mol/kg of side chain C = C groups.

Samples of the copolymer are compounded with increasing amounts of metaphenylenebis(maleimide). The resulting compositions are heated at 170°C. for 1 hour, and the properties are then measured at 25°C. The results are shown in Table 1.

TABLE 1

| | | | | | |
|---|---|---|---|---|---|
| Bis(maleimide) g-mols/kg of polymer | 0[1] | 0.05 | 0.10 | 0.125 | 0.15 |
| Tensile strength at break (kg/cm$^2$) | 45 | 27 | 27 | 22 | 26 |
| Extension at Break (%) | 640 | 200 | 100 | 110 | 120 |
| Permanent Set at Break (%) | 95 | 4 | 2 | 1 | 0 |

The cure is stable and is not reversible at 200°C., even in the presence of a Lewis acid such as the complex of Z$_h$Br$_2$ with 2,2'-dithiobis(benzothiazole).

Table 1 shows that a "tight" cure is obtained even when rather low proportions of the bis(dienophile) are used as shown by the low permanent set and extension at break.

B. Diels-Alder Cure of Ethylene/Propylene/1,6,8-Decatriene Copolymer using Metaphenylenebis(citraconimide)

A copolymer having a monomer unit composition of 43.6 percent ethylene, 55 percent propylene, and 1.4 percent 1,6,8-decatriene is prepared by a procedure similar to that of Example 2B. The copolymer is 70 percent soluble in tetrachloroethylene at 25°C.; the soluble fraction has an inherent viscosity of 2.70, and the copolymer has about 0.2 gram-mol/kg. of side chain C = C groups.

A sample of the copolymer is compounded with metaphenylenebis(citraconimide) in the proportion of 0.10 gram-mole bis(citraconimide) per kilogram of copolymer. The composition is heated at 200°C. for 1 hour. The resulting cross-linked composition has the following typical properties at 25°C.:

| | |
|---|---|
| Modulus at 300% extension (kg/cm$^2$) | 48.5 |
| Tensile Strength at Break (kg/cm$^2$) | 53 |
| Extension at Break (%) | 330 |
| Permanent Set at Break (%) | 28 |

C. Diels-Alder Cure of Ethylene/Propylene/1,6,8-Decatriene with Benzoquinone and Tetracyano-1,4-dithiin A copolymer having a monomer unit composition of 25.6 percent ethylene, 71 percent propylene, and 3.4 percent 1,6,8-decatriene is prepared by a procedure similar to that of Example 2B. The copolymer is about 85 percent soluble in tetrachloroethylene at 25°C., the soluble fraction has an inherent viscosity of about 3.1, and the copolymer has about 0.5 gram-mol/kg of side chain C = C groups.

Samples of the copolymer are separately compounded with benzoquinone and tetracyano-1,4-dithiin (TCD) in the proportion of 0.1 gram-mol of benzoquinone or TCD per kilogram of copolymer. The compositions are heated at 170°C. for 1 hour. The resulting vulcanizates have the following properties at 25°C.:

|  | EPTM with Benzoquinone | EPTM with TCD | Control, no curing agent |
|---|---|---|---|
| Modulus at 200% extension (kg/cm²) | 21 | 17 | 12 |
| Modulus at 300% extension (kg/cm²) | 27 | 23 | 14 |
| Tensile Strength at Break (kg/cm²) | 32 | 34 | 30 |
| Extension at Break (%) | 340 | 440 | 640 |
| Permanent Set at Break (%) | 20 | 34 | 95 |

EXAMPLE 4

A. Preparation of N-p-carboxyphenylmaleimide

A 150-ml. portion of dimethyl formamide containing 27 ml. (0.28 gram-mol) of acetic anhydride, 0.82 gram (0.014 gram-mol) of sodium acetate, and 32.9 grams (0.14 gram-mol) of the N-p-carboxyphenylamide of maleic acid is allowed to stand at 25°C. for about 16 hours. The desired N-p-carboxyphenylmaleimide is precipitated in 1,500 ml. of water and oven dried. The maleimide weighs 27.0 grams and melts at 227°–230°C. Anal. Calc'd. (by weight): %C, 60.81; %H, 3.25; %N, 6.45. Found (by weight): %C, 60.5; %H, 3.1; %N, 6.36.

B. Reversible Ionic Cure of E/P/1,6,8-Decatriene Copolymer With N-p-carboxyphenyl Maleimide A composition is compounded using the ethylene/propylene/1,6,8-decatriene of Example 3B, and adding 0.25 gram-moles of N-p-carboxyphenylmaleimide and 0.6 gram-moles of zinc oxide per kilogram of copolymer. The resulting composition can undergo a reversible ionic cure as shown by the following experiment. The composition is shaped into 2.5 × 0.75 × 0.05 inch slabs, and then compression molded for 10 minutes at 170°C. The cured slabs are then cut into 63.5 mm. × 6.4 mm. × 1.3 mm. specimens for stress/strain measurements. After measurements, the specimens are cut up, remolded as before, and stress-strain properties are again measured. This process is repeated four more times. The first four remolding cycles are at 170°C. for 10 minutes, and the fifty remolding cycle is at 170°C. for 1 hour.

Data so obtained is reported in the table below, and it shows that no loss of properties occurs. All tests were at 25°C.

| Molding Conditions | Initial Molding | Remoldings | | | | |
|---|---|---|---|---|---|---|
|  |  | 1st | 2nd | 3rd | 4th | 5th |
| Time (min.) | 10 | 10 | 10 | 10 | 10 | 60 |
| Temp. (°C.) | 170 | 170 | 170 | 170 | 170 | 170 |
| Properties of Cured Slabs |  |  |  |  |  |  |
| Modulus at 200% Extension (kg/cm²) | 20 | 26 | 31 | Poor Specimen | 53 | 42 |
| Modulus at 300% Extension (kg/cm²) | 25 | 31 | 39 | do. | not det. | 60 |
| Tensile Strength at Break (kg/cm²) | 39 | 56 | 51 | do. | 63 | 60 |
| Extension at Break (%) | 490 | 530 | 390 | do. | 240 | 300 |
| Permanent Set at Break (%) | 56 | 60 | 36 | do. | 20 | 23 |

What is claimed is:

1. An elastomeric copolymer of
   a. ethylene
   b. at least one low molecular weight α-monolefin, and
   c. at least one of 1,4,6-octatriene and 1,6,8-decatriene,
   said copolymer having an inherent viscosity of about 0.2 to 6.0 and being capable of undergoing a Diels-Alder reaction with a dienophile.

2. The copolymer of claim 1 wherein (b) is propylene and the polymeric units of ethylene and propylene are present in a weight ratio of 15–75 to 25–85, and the triene units are present in about 0.1 to 10 mole percent of the copolymer.

3. A moldable composition containing:
   a. the elastomeric EOTM copolymer of claim 1, and
   b. a bis-dienophile curing agent.

4. The cured elastomeric copolymer of claim 1.

5. A process for preparing a copolymer of claim 1 comprising contacting
   a. ethylene
   b. at least one low molecular weight α-monolefin, and
   c. at least one of 1,4,6-octatriene and 1,6,8-decatriene
   in the presence of a solvent and a catalyst which consists essentially of (A) at least one organoaluminum compound, (B) at least one organomagnesium compound, and (C) at least one hydrocarbon-soluble titanium compound at a temperature of about −20° to 150°C. and allowing the monomers to polymerize to produce the desired copolymer.

6. The process of claim 5 wherein the atomic ratio of Al:Mg:Ti is about 1–100:1–5:1, and a. aluminum is present as an organoaluminum halide, and
b. titanium is present as at least one of titanium tetrahalide, an organotitanium halide, and an organo titanate.

7. The process of claim 6 wherein:
a. aluminum is present as at least one acyclic organoaluminum halide wherein the acyclic substituents independently contain 2 to 12 carbon atoms and the halide is chlorine or bromine;
b. magnesium is present as at least one of an diaryl magnesium wherein the aryl substituents independently have 6 to 22 carbon atoms, and a dialkyl magnesium wherein the alkyl substituents independently have 2 to 20 carbon atoms; and
c. titanium is present as at least one of titanium tetrahalide, a tetraalkyl titanate, an alkyl titanium halide, and titanium tris(acetyl acetonate).

8. The process of claim 7 wherein titanium is present in the amount of 0.1 to 10 millimoles per liter of reaction solution.

* * * * *